(12) United States Patent
Gnann

(10) Patent No.: US 10,651,878 B2
(45) Date of Patent: May 12, 2020

(54) PROCESSING OF A BROADCAST SIGNAL

(71) Applicant: Preh Car Connect GmbH, Dresden (DE)

(72) Inventor: Volker Gnann, Dresden (DE)

(73) Assignee: PREH CAR CONNECT GMBH, Dresden (DE)

(*) Notice: Subject to any disclaimer, the term of this patent is extended or adjusted under 35 U.S.C. 154(b) by 29 days.

(21) Appl. No.: 16/138,185

(22) Filed: Sep. 21, 2018

(65) Prior Publication Data
US 2019/0149182 A1 May 16, 2019

(30) Foreign Application Priority Data
Sep. 30, 2017 (DE) .................. 10 2017 009 206

(51) Int. Cl.
| | |
|---|---|
| H04B 1/10 | (2006.01) |
| H04H 60/47 | (2008.01) |
| H04H 60/65 | (2008.01) |
| H04B 17/336 | (2015.01) |

(52) U.S. Cl.
CPC ......... *H04B 1/1036* (2013.01); *H04B 17/336* (2015.01); *H04H 60/47* (2013.01); *H04H 60/65* (2013.01); *H04B 2001/1054* (2013.01); *H04B 2001/1063* (2013.01)

(58) Field of Classification Search
None
See application file for complete search history.

(56) References Cited

FOREIGN PATENT DOCUMENTS

| DE | 10317701 A1 | 5/2017 |
|---|---|---|
| EP | 2928094 A1 | 10/2015 |

*Primary Examiner* — James P Duffy
(74) *Attorney, Agent, or Firm* — M&B IP Analysts, LLC

(57) ABSTRACT

A broadcast receiver for processing of a broadcast signal, and a method for processing a broadcast signal by a broadcast receiver. The broadcast receiver includes: a receiver unit that is set up to receive the broadcast signal and convert the received broadcast signal into a digital data signal; a bandwidth filter unit that is set up to filter the data signal with a variable filtering bandwidth; a demodulation unit that is set up to demodulate the filtered data signal; a signal content analysis unit that is set up to determine a signal content of the demodulated data signal; a signal quality analysis unit that is set up to determine a signal quality of the data signal; and a bandwidth regulation unit that is set up to regulate the filtering bandwidth depending on the signal content and the signal quality.

10 Claims, 2 Drawing Sheets

PROCESSING OF A BROADCAST SIGNAL

Figure 1:
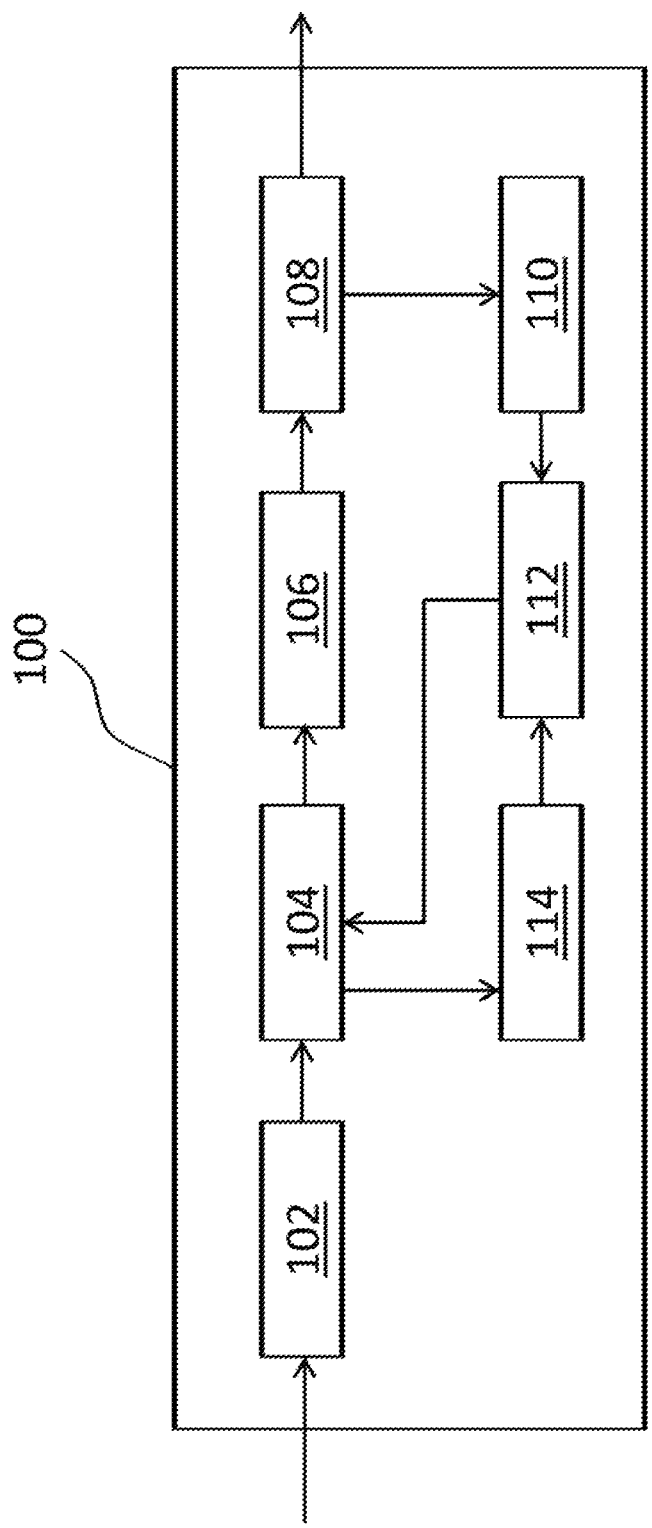

This application claims priority to the German Application No. 10 2017 009 206.0, filed Sep. 30, 2017, now pending, the contents of which are hereby incorporated by reference.

The present disclosure relates to a broadcast receiver and a method for processing a broadcast signal, wherein the broadcast signal is converted into a digital data signal.

A broadcast receiver that converts a broadcast signal into a digital data signal and processes it has an antenna to receive the analog broadcast signal and an analog/digital converter to convert the broadcast signal into the digital signal. For example, the data signal is processed by means of software (SDR, software defined radio).

The received broadcast signal is normally pre-filtered as an analog signal before digitization in order to limit the bandwidth to a frequency range around a desired reception frequency. Often, before digitization the frequencies of the broadcast signal are decreased into an intermediate frequency range because, according to the Nyquist-Shannon sampling theorem, the lower frequencies enable a lower sampling frequency for digitizing the broadcast signal due to the resulting lower bandwidth. The intermediate frequency signal is often amplified before digitizing.

Often, what is known as an I/O signal with an I component (in-phase component) and a Q component (quadrature component) is generated as a digital data signal. The I/O signal can be represented as a complex signal with the I component as real part and the Q component as imaginary part. The I/O signal has information about both the amplitude size and the phase position of the analog signal.

It is the object of the present disclosure to specify a broadcast receiver and a method for processing a digitized broadcast signal that are improved with regard to a bandwidth regulation of the digitized broadcast signal.

The object is achieved with a broadcast receiver according to the present disclosure. The broadcast receiver has the following components:
a. a receiver unit that is set up to receive a broadcast signal and convert the received broadcast signal into a digital data signal,
b. a bandwidth filter unit that is set up to filter the data signal with a variable filtering bandwidth,
c. a demodulation unit that is set up to demodulate the filtered data signal,
d. a signal content analysis unit that is set up to determine a signal content of the demodulated data signal,
e. a signal quality analysis unit that is set up to determine a signal quality of the data signal, and
f. a bandwidth regulation unit that is set up to regulate the filtering bandwidth depending on the signal content and the signal quality.

The receiver unit has an antenna to receive the analog broadcast signal and an analog/digital converter to convert the broadcast signal into the digital signal. For example, an I/O signal is generated by the analog/digital converter as a digital data signal.

The receiver unit may also have an analog pre-filter in order to limit the bandwidth of the broadcast signal to a frequency range around a desired reception frequency before its digitization. Moreover, the receiver unit may have a mixer in order to decrease the frequencies of the broadcast signal into an intermediate frequency range before its digitization. Furthermore, the receiver unit may have a signal amplifier with which the broadcast signal may be amplified before its digitization, for example after decreasing the frequencies into the intermediate frequency range.

The variable filtering bandwidth of the bandwidth filter unit enables the filtering bandwidth to be adapted to the respective broadcast signal and its signal quality and signal content.

The demodulation unit enables the frequency modulation of the filtered data signal to be reversed and thereby enables a usable signal to be extracted from the filtered data signal.

The signal content analysis unit enables a signal content of the data signal to be determined and used, by means of the bandwidth regulation unit, for adaptation of the filtering bandwidth.

The signal quality analysis unit enables a signal quality of the data signal to be determined and used, by means of the bandwidth regulation unit, for adaptation of the filtering bandwidth to the signal quality. For this purpose, the signal quality analysis unit evaluates at least one parameter of the signal quality of the data signal, such as a signal strength, a signal-to-noise ratio and/or a distortion of the data signal.

The bandwidth regulation unit enables the filtering bandwidth to be adapted to the signal content and the signal quality. For this purpose, the bandwidth regulation unit is connected with the bandwidth filter unit, the signal content analysis unit and the signal quality analysis unit.

If the signal quality of the data signal decreases, the filtering bandwidth may be reduced by means of the bandwidth regulation unit in order to reduce a negative effect on the reproduction quality of the broadcast signal due to interference. The filtering bandwidth may also be changed by means of the bandwidth regulation unit if the signal content of the data signal requires that in order to achieve a good reproduction quality. Furthermore, the filtering bandwidth may be increased by means of the bandwidth regulation unit if the signal quality and the signal content of the data signal allow this without significant reproduction quality losses.

One embodiment of the broadcast receiver provides that the signal content analysis unit is set up to establish whether the data signal has speech content or music content.

That enables the filtering bandwidth used to filter the data signal to be made dependent on whether the data signal has speech content or music content. This forms the basis of the consideration that the use of different filtering bandwidths may be advantageous for speech contents and music contents. This is based on the fact that music contents are preferably reproduced stereophonically, whereas the stereophonic reproduction of purely speech contents is normally not required.

Speech contents are most often not transmitted stereophonically since the speech contents are recorded only by means of one microphone. Even if speech contents are recorded and transmitted stereophonically, a stereophonic reproduction is most often normally unnecessary for the comprehension of the speech contents.

Since a stereophonic reproduction requires a higher filtering bandwidth than a monophonic reproduction, normally a smaller filtering bandwidth than for the processing of a data signal with music content is sufficient for the processing of a data signal with speech content. The use of a smaller filtering bandwidth for speech content in particular has the advantage that the data signal is thereby less negatively affected by reception interference, which has a negative effect on the comprehensibility of the speech content. The comprehensibility of the reproduced speech content may thus be improved.

An additional embodiment of the broadcast receiver provides that the bandwidth filter unit has a plurality of a bandwidth filters with filtering bandwidths differing from one another, or a bandwidth filter with a variable filtering bandwidth.

That enables the filtering bandwidth to be set via the selection of a bandwidth filter or by changing the filtering bandwidth. The filtering bandwidth can thereby be adapted to the signal quality and the signal content.

The object is also achieved with a method for processing a broadcast signal by means of a broadcast receiver. The method has the following steps:
a. receive the broadcast signal,
b. convert the received broadcast signal into a digital data signal,
c. filter the data signal with a variable filtering bandwidth,
d. demodulate the filtered data signal,
e. determine a signal content of the demodulated data signal,
f. determine a signal quality of the data signal, and
g. regulate the filtering bandwidth depending on the signal content and the signal quality.

The method according to the present disclosure enables a broadcast signal to be converted into a digital data signal, and the data signal to be filtered with a filtering bandwidth that is adapted to the signal content and the signal quality of the data signal. Refer to the above statements with regard to the advantages of the adaptation.

In one embodiment of the method according to the present disclosure, upon determination of the signal content of the data signal it is established whether the data signal has speech content or music content.

That enables the filtering bandwidth used to filter the data signal to be made dependent on whether the data signal has speech content or music content. The above statements are referenced with regard to the advantages resulting therefrom.

In a further embodiment of the method according to the present disclosure, a support vector machine that is based on an average pitch density and a relative tonal energy density is used to establish whether the data signal has speech content or music content.

A pattern recognition method in which objects are associated with object classes is referred to as a "support vector machine". The objects are represented by object points of an object space. The object classes are represented by partial spaces of the object space that are separated from one another by separating planes in said object spaces. An object is associated with that object class in whose partial space is situated the object point represented by the object. The position of the separating planes is determined by training objects whose association with an object class is respectively known and which are used to train the support vector machine.

The objects of the support vector machine are the data signals. The object point of a data signal is defined by an average pitch density (APD) of the data signal and a relative tonal power density (RTPD) of the data signal. In other words, the average pitch density and the relative tonal power density form coordinates of the object space. Using the average pitch density and the relative tonal power density of training data signals, the support vector machine defines two respective partial spaces of the object space that represent an object class in order to establish whether a data signal has speech content or music content. A first object class is defined by training data signals that respectively have speech content, and the second object class is defined by training data signals that respectively have music content.

The average pitch density is a decision criterion that is aimed at the tonal characteristics of speech and music in order to differentiate speech contents and music contents from one another. The relative tonal energy density is in particular aimed at the properties of percussion instruments. The differentiation between speech and music on the basis of the average pitch density and the relative tonal energy density is, for example, discussed in Zhong-Hua Fu et al: Noise robust features for speech/music discrimination in real-time telecommunication, Proc. IEEE ICME'09, New York, USA, S. 574-577, June-July 2009, DOI: 10.1109/ICME.2009.5202561.

The average pitch density and the relative tonal energy density of the data signal are consequently determined, and from this it is determined by means of the support vector machine whether the data signal has speech content or music content.

The average pitch density and the relative tonal energy density are especially suitable decision criteria in order to differentiate speech contents and music contents from one another since their determination requires relatively little computation time and thereby enables a real-time-capable differentiation. The differentiation between speech contents and music contents using the average pitch density and the relative tonal energy density is also largely insensitive to noise and interference of the data signal and enables a high match rate, meaning a reliable differentiation between speech contents and music contents.

As an alternative to the support vector machine, a different method, for example a Gaussian mixture method, may be used to establish whether the data signal has speech content or music content.

In a further embodiment of the method according to the present disclosure, a smaller filtering bandwidth is set if it is established that the data signal has speech content than if it is established that the data signal has music content.

This is based on the consideration that the transmission and output of speech content with a sufficient quality normally requires a smaller filtering bandwidth than the transmission and output of music content. As was presented above, speech content is often acquired and transmitted as a mono signal. Moreover, speech content normally needs only to be output monophonically, even if it has been recorded and transmitted stereophonically. By contrast to this, music content is normally output stereophonically and therefore requires a higher filtering bandwidth than speech content.

In a further embodiment of the method according to the present disclosure, a filtering bandwidth with which a frequency range of the difference component of the broadcast signal is suppressed is set if it is established that the data signal has speech content.

A broadcast signal is typically transmitted as an MS (mid/side) signal that has a sum component and a difference component. The sum component is formed from the sum of a right channel signal and a left channel signal. The difference component is formed from the difference of the left channel signal and the right channel signal. The sum component and the difference component are transmitted in different frequency ranges. In the present embodiment, a filtering bandwidth is preferably set that suppresses the frequency range of the difference component if it is established that the data signal has speech content. Interference occurring in this frequency range is thereby suppressed, and thus the susceptibility of the broadcast signal to interference is reduced.

In a further embodiment of the method according to the present disclosure, RDS data are evaluated in the determination of the signal content.

RDS (radio data system) data are state data that may be transmitted with the broadcast signal. The evaluation of the RDS data in the determination of the signal content enables the incorporation of the RDS data into the regulation of the filtering bandwidth. For example, RDS data may have a TP (traffic program) signal with which the transmission of traffic information, for example about jams or hazards, is announced via traffic radio. Such RDS data may additionally be used in order to detect whether the data signal has speech content or music content.

In a further embodiment of the method according to the present disclosure, the signal quality is determined using a signal strength, a signal-to-noise ratio and/or a distortion of the data signal.

With this it is taken into account that the signal quality of the data signal significantly depends on a signal strength, on a signal-to-noise ratio, and on a distortion due to a multipath reception and/or due to interference of adjacent broadcast signals.

Additional exemplary embodiments of the present disclosure are explained in detail using the following drawings.

Figure 2:
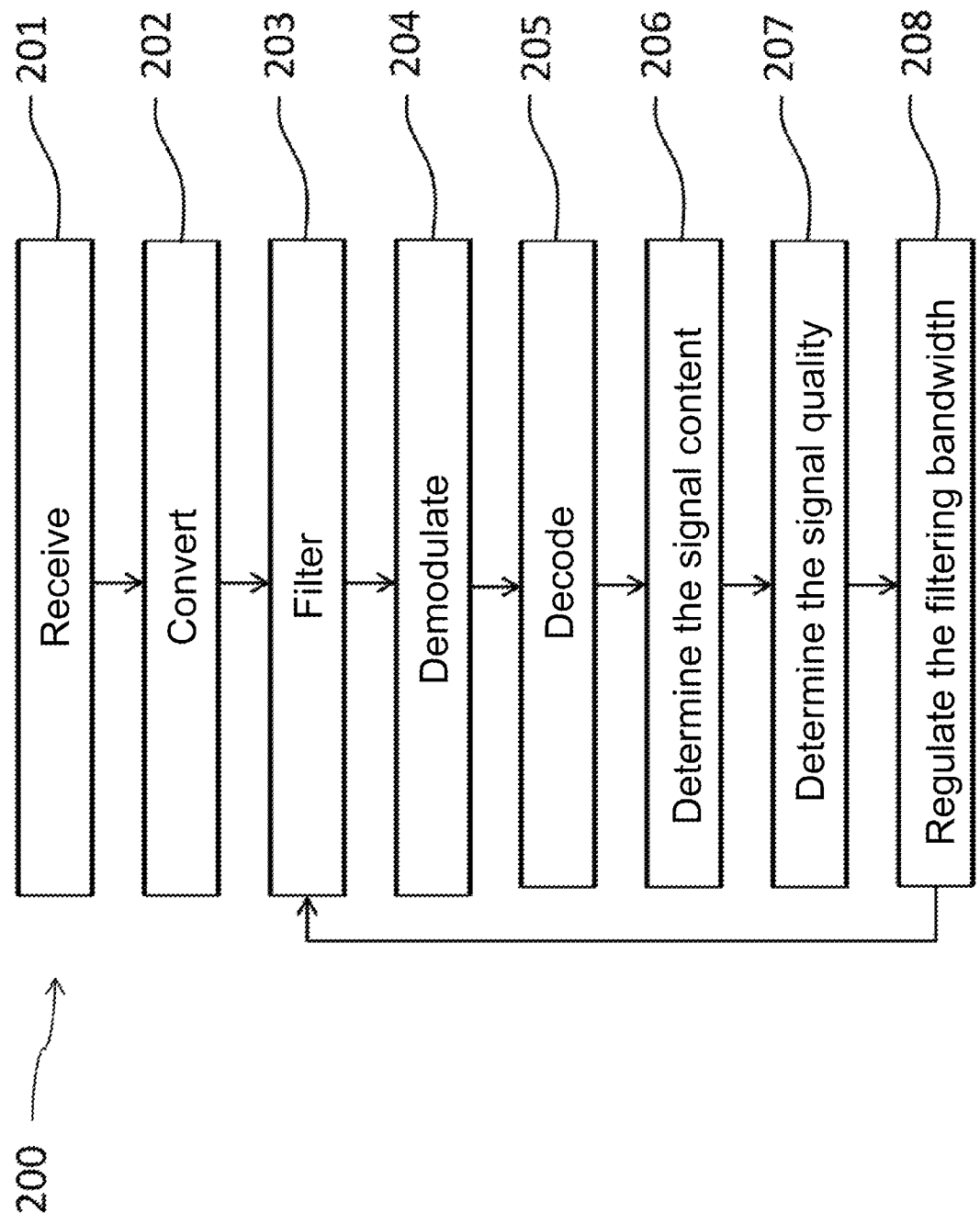

Thereby shown are:

FIG. 1 is a block diagram of a broadcast receiver according to the present disclosure, and FIG. 2 is a workflow diagram of a method according to the present disclosure for processing of a broadcast signal.

FIG. 1 shows a block diagram of a broadcast receiver 100 according to the present disclosure. The broadcast receiver 100 has a receiver unit 102, a bandwidth filter unit 104, a demodulation unit 106, a stereo decoder unit 108, a signal content analysis unit 110, a signal quality analysis unit 114 and a bandwidth regulation unit 112.

The receiver unit 102 is set up to receive a broadcast signal and convert the received broadcast signal into a digital data signal. For this purpose, the receiver unit 102 has an antenna to receive the analog broadcast signal and an analog/digital converter to convert the broadcast signal into the digital signal. The receiver unit 102 may also have an analog pre-filter in order to limit the bandwidth of the broadcast signal to a frequency range around a desired reception frequency before its digitization. Moreover, the receiver unit 102 may have a mixer in order to decrease the frequencies of the broadcast signal into an intermediate frequency range before its digitization. Furthermore, the receiver unit 102 may have a signal amplifier by means of which the broadcast signal may be amplified before its digitization and possibly after decreasing its frequencies into the intermediate frequency range.

For example, an I/O signal is generated by the analog/digital converter as a digital data signal.

The bandwidth filter unit 104 is set up to filter the data signal with a variable filtering bandwidth. For this purpose, the bandwidth filter unit 104 has, for example, multiple bandwidth filters with filtering bandwidths differing from one another or one bandwidth filter with a variable filtering bandwidth.

The demodulation unit 106 is set up to demodulate the filtered data signal. For this purpose, the demodulation unit 106 reverses the frequency modulation in the data signal and generates a demodulated multiplex signal.

The stereo decoder unit 108 is designed to extract a pilot tone from the multiplex signal and to generate a stereo audio signal from the multiplex signal using the pilot tone. The stereo audio signal may be output to a user of the broadcast receiver 100.

The signal content analysis unit 110 is set up to determine a signal content of the data signal. In particular, the signal content analysis unit 110 is provided to establish whether the data signal has speech content or music content. For this purpose, for example, an average pitch density (APD) and a relative tonal power density (RTPD) of the data signal are determined and used by the signal content analysis unit 110.

For this purpose, the signal content analysis unit 110 has, for example, a support vector machine that is based on the average pitch density and the relative tonal energy density. In other words, the average pitch density and the relative tonal power density form coordinates of an object space of the support vector machine. The support vector machine is trained to establish, using the average pitch density and the relative tonal energy density, whether the data signal has speech content or music content. For this purpose, the support vector machine associates the data signal with one of two object classes, wherein a first object class has data signals that respectively have speech content, and the second object class has data signals that respectively have music content.

The average pitch density and the relative tonal energy density of the data signal may be determined with relatively small computation effort and therefore enable a real-time-capable differentiation between speech contents and music contents. The differentiation between speech contents and music contents using the average pitch density and the relative tonal energy density is also largely insensitive to noise and interference of the data signal and enables a high match rate, meaning a reliable differentiation between speech contents and music contents. The average pitch density and the relative tonal energy density of the data signal are therefore especially suitable differentiation criteria in order to differentiate speech content and music content from one another.

The signal quality analysis unit 114 is provided to determine a signal quality of the data signal. For example, the signal quality analysis unit 114 is set up to determine the signal quality of the data signal using a signal strength, a signal-to-noise ratio and/or a distortion of the data signal.

The bandwidth regulation unit 112 is set up to regulate the filtering bandwidth depending on the signal content and the signal quality of the data signal. For this purpose, the bandwidth regulation unit 112 is connected with the bandwidth filter unit 104, the signal content analysis unit 110 and the signal quality analysis unit 114. The bandwidth regulation unit 112 controls the bandwidth filter unit 104 depending on the signal content determined by the signal content analysis unit 110 and on the signal quality determined by the signal quality analysis unit 114 in order to adapt the filtering bandwidth to the signal content and the signal quality of the data signal.

For example, if the bandwidth filter unit 104 has a plurality of bandwidth filters with filtering bandwidths varying from one another, one of the bandwidth filters is selected by the bandwidth regulation unit 112 depending on the signal content and the signal quality of the data signal. If the bandwidth filter unit 104 has a bandwidth filter with a variable filtering bandwidth, the filtering bandwidth is set depending on the signal content and the signal quality of the data signal.

FIG. 2 shows a workflow diagram 200 of a method according to the present disclosure for processing of a broadcast signal. The method is executed using the broadcast receiver 100 according to the present disclosure, which was described with reference to FIG. 1.

In a first method step 201, the broadcast signal is received by means of the receiver unit 102.

In a second method step 202, the received broadcast signal is converted by means of the receiver unit 102 into a digital data signal. For example, an I/Q signal with an I component and a Q component is generated as a digital signal from the received broadcast signal.

In a third method step 203, the data signal is filtered with a defined filtering bandwidth by means of the bandwidth filter unit 104. If the bandwidth filter unit 104 has a plurality of bandwidth filters with filtering bandwidths differing from one another, one of these bandwidth filters is used to filter the data signal. If the bandwidth filter unit 104 has a bandwidth filter with a variable filtering bandwidth, the filtering bandwidth is set depending on the signal content and the signal quality of the data signal.

In a fourth method step 204, the filtered data signal is demodulated by means of the demodulation unit 106. The frequency modulation of the data signal is thereby reversed, and a demodulated multiplex signal is generated.

In a fifth method step 205, a pilot tone is extracted from the multiplex signal by means of the stereo decoder unit 108, and a stereo audio signal is generated from the multiplex signal using the pilot tone. The stereo audio signal may be output to a user of the broadcast receiver.

In a sixth method step 206, a signal content of the data signal is determined by means of the signal content analysis unit 110. In particular, it is thereby established whether the data signal has speech content or music content. For example, an average pitch density and a relative tonal energy density of the data signal are used for this purpose.

In order to establish, using the average pitch density and the relative tonal energy density of the data signal, whether the data signal has speech content or music content, a support vector machine is used, for example, that has been trained to differentiate speech content and music content using the average pitch density and the relative tonal energy density of training data signals with known signal contents. The support vector machine divides an object space whose object points are respectively defined by an average pitch density and a relative tonal energy density into two partial spaces that respectively represent an object class. A first object class is represented by a first partial space of the object space that has object points of training data signals that respectively have speech content. The second object class is represented by a second partial space of the object space that has object points of training data signals that respectively have music content.

If, due to its average pitch density and its relative tonal energy density, the data signal is represented by an object point that lies in the first partial space, it is established that the data signal has speech content. If, due to its average pitch density and its relative tonal energy density, the data signal is represented by an object point that lies in the second partial space, it is established that the data signal has music content.

A data signal that has both speech content and music content is preferably treated like a data signal that has only music content. For this purpose, a training signal that has both speech content and music content is associated with the same object class as a training data signal that has only music content.

RDS data may additionally be evaluated in the determination of the signal content of a data signal.

In a seventh method step 207, a signal quality of the data signal is determined by means of the signal quality analysis unit 114. For example, for this purpose a signal strength, a signal-to-noise ratio and/or a distortion of the data signal that is caused by a multipath reception or by an adjacent transmitter is determined.

In an eighth method step 208, the filtering bandwidth is regulated by means of the bandwidth regulation unit 112 depending on the signal content and the signal quality.

If the signal quality of the data signal decreases given consistent signal content, the filtering bandwidth may be reduced by means of the bandwidth regulation unit 112 in order to reduce a negative effect on the quality of the reproduction of the broadcast signal due to interference. The filtering bandwidth may accordingly be increased by means of the bandwidth regulation unit 112 if an increase in the signal quality enables this without significant quality losses in the reproduction of the broadcast signal.

For example, for this purpose signal quality ranges are provided for the signal quality and are associated with a respective filtering bandwidth.

The filtering bandwidth is also regulated depending on whether the data signal has speech content or music content. For example, a smaller filtering bandwidth is set if it is established that the data signal has speech content than if it is established that the data signal has music content.

For example, a filtering bandwidth with which a frequency range of the difference component of the broadcast signal is suppressed is set if it is established that the data signal has speech content.

The broadcast signal is typically an MS signal, which has a sum component and a difference component. The sum component is formed from the sum of a right channel signal and a left channel signal. The difference component is formed via subtraction of the right channel signal from the left channel signal. The sum component and the difference component are transmitted in different frequency ranges. Via the suppression of the difference component, interference occurring in its frequency range is suppressed. The interference resistance of a broadcast signal that has speech content may thereby be increased without significant quality loss of the broadcast signal itself.

For example, after decreasing the frequencies of the broadcast signal into the intermediate frequency range, the difference component has frequencies in a frequency range between 23 kHz and 53 kHz, whereas the sum component has frequencies in a frequency range between 0 kHz and 15 kHz. If it is established that the data signal has speech content, a filtering bandwidth is set that suppresses the frequency range between 23 kHz and 53 kHz. However, if it is established that the data signal has music content, a filtering bandwidth is set that covers the entire frequency range between 0 kHz and 53 kHz.

To regulate the filtering bandwidth of the bandwidth filter unit 104, a nominal filtering bandwidth is determined by the bandwidth regulation unit 112 depending on the signal content and the signal quality of the data signal and the filtering bandwidth is regulated to the nominal filtering bandwidth by the bandwidth regulation unit 112. If the bandwidth filter unit 104 has multiple bandwidth filters with filtering bandwidths that differ from one another, one of the bandwidth filters whose bandwidth corresponds to the nominal filtering bandwidth is selected by the bandwidth regulation unit 112. If the bandwidth filter unit 104 has a bandwidth filter with a variable filtering bandwidth, the filtering bandwidth is set by the bandwidth regulation unit 112 depending on the signal content and the signal quality of the data signal.

The invention claimed is:

1. A broadcast receiver for processing of a broadcast signal, comprising:
   a receiver unit that is set up to receive the broadcast signal and convert the received broadcast signal into a digital data signal;
   a bandwidth filter unit that is set up to filter the data signal with a variable filtering bandwidth;
   a demodulation unit that is set up to demodulate the filtered data signal;
   a signal content analysis unit that is set up to determine a signal content of the demodulated data signal;
   a signal quality analysis unit that is set up to determine a signal quality of the data signal; and
   a bandwidth regulation unit that is set up to regulate the filtering bandwidth depending on the signal content and the signal quality.

2. The broadcast receiver of claim 1, wherein the signal content analysis unit is set up to establish whether the data signal has speech content or music content.

3. The broadcast receiver of claim 1, wherein the bandwidth filter unit has multiple bandwidth filters with filtering bandwidths differing from one another, or one bandwidth filter with a variable filtering bandwidth.

4. A method for processing of a broadcast signal by a broadcast receiver, the method comprising:
   receiving the broadcast signal;
   converting the received broadcast signal into a digital data signal;
   filtering the data signal with a variable filtering bandwidth;
   demodulating the filtered data signal;
   determining a signal content of the demodulated data signal;
   determining a signal quality of the data signal; and
   regulating the filtering bandwidth depending on the signal content and the signal quality.

5. The method of claim 4, wherein the determining a signal content further includes determining whether the data signal contains speech content or music content.

6. The method of claim 5, wherein a support vector machine that is based on an average pitch density and a relative tonal energy density is used to determine whether the data signal has speech content or music content.

7. The method of claim 5, wherein a smaller filtering bandwidth is set when it is determined that the data signal has speech content, and a larger filtering bandwidth is set when it is determined that the data signal has music content.

8. The method of claim 5, wherein a filtering bandwidth with which a frequency range of the difference component of the broadcast signal is suppressed is set when it is determined that the data signal has speech content.

9. The method of claim 4, wherein radio data system (RDS) data are evaluated in the determination of the signal content.

10. The method of claim 4, wherein the signal quality is determined using at least one of: a signal strength value, a signal-to-noise ratio and a distortion of the data signal value.

* * * * *